United States Patent Office 3,185,589
Patented May 25, 1965

3,185,589
METHOD OF COATING FINELY DIVIDED METAL PARTICLES
Eugene P. Damm, Jr., Endwell, N.Y., assignor to International Business Machines Corporation, New York, N.Y., a corporation of New York
No Drawing. Filed Dec. 21, 1961, Ser. No. 161,266
9 Claims. (Cl. 117—100)

This invention relates to a new method of coating finely divided metal particles at relatively low temperature, e.g., at room temperature, based upon a new use of electrostatic attraction between the positively charged metal particles and the negatively charged resin particle in colloidal form in a volatile system. A film-forming coating resin material is dissolved in a volatile water-miscible organic solvent and converted into negatively charged colloidal form by adding water to the solvent, whereafter the charged resin particles are deposited uniformly about the positively charged metal particles suspended in the volatile water miscible organic solvent. In this manner the material is applied as a uniformly-thin predetermined layer completely enveloping each negatively charged metal particle suspended in the solvent. Coating is thus effected solely by virtue of the positive charge exhibited by the metal particle substrate attracting the negative charge of the resin colloid, the latter produced by addition of a controlled amount of water to convert the resin from a solution condition to a positively charged colloidal suspension.

Heretofore, certain film forming resin materials have been used for coating in charged colloidal form and these materials are known to exist as colloidal dispersions in water miscible organic solvents, but the colloidal particles of the resin which are suspended are positively charged rather than negatively charged.

Such positively charged resin colloids are known in the art as cationic resins and a typical example is shown in U.S. Patent to Wohnsiedler, Patent No. 2,345,543 which relates to amino triazine resins used for coating textiles. It is a characteristic of the cationic colloidally dispersed aminotriazine-aldehyde resins of the Wohnsiedler at al. patent that the positive electric charge produce a controlled deposition of the resin or negatively charged materials such as cellulosic fibers in extremely thin films and results in complete exhaustion of the colloidal resin from the coating solution or suspension.

It has been discovered that certain thermoplastic resins which are soluble in water-miscible lower aliphatic solvents to a degree of at least 5% by weight, typical water-miscible solvents being ethylacohol, isopropyl alcohol, aceton, methyl ethyl ketone, acetonitrile can be converted into negatively charged colloidal particles of resin by the simple addition of water to the solvent solution of the resin.

Suitable thermoplastic resins which are desirably used in accordance with the invention are polymers of methyl methacrylate having relative viscosities between 1.117 and 1.196; copolymers of a member of the group consisting of methacrylate acid, a 1-4 carbon atom alkyl ester of acrylic acid, a 2-4 carbon carbon atom alkyl ester of methacrylic acid, vinyl acetate, acrylonitrile and styrene; polyamides having the polyacyl group of polymerized polyene fatty acids, and the polyamino group of an aliphatic polyamine, the polyamide having a molecular weight within the approximate range of 1,000 to 10,000; acrylates ester resins such as homopolymers and copolymers of the acrylates esters contining from 1–18 carbon atoms in the alcohol group (polyethylacrylate) and low molecular weight (less than 20,000) vinyl chloride-vinylidene chloride copolymers containing from 20%–40% of vinylidene chloride or similar low molecular weight vinyl chloride-vinyl acetate copolymers containing more than 60% of vinyl chloride.

It is surprising that the present system can be used to achieve the result heretofore achieved with negatively charged particles, since it has been determined that metal particles are positively charged when suspended in the water-miscible solvent used for the resin colloidal dispersing medium.

One would not expect that the unique class of suitable resin would be negatively charged in water-miscible organic solvent containing sufficient water to suspend the precipitated resin particle in colloidal form, in view of the recognition that the melamine formaldehyde resin solution contain resin which is positively charged.

By virtue of the new method based upon the opposite charge attraction coating, metal particles which are positively charged can be provided with extremely thin and uniform coatings in contrast with the impossibility of this system in the case of the cationic melamine formaldehyde resin solution used in the patent to Wohnsiedler et al., Patent No. 2,345,543.

An important advantage of the process of the invention lies in the new capability of providing an extremely thin coating of resin of any desired hardness for magnetic metal materials particularly useful in preparing magnetic core material to give much magnetic higher efficiencies because of better packing and to make magnetic inks having superior printing characteristics owing to the thinner coating.

Heretofore, the conventional coating of metal particles required mechanical milling in a ball mill (see U.S. Patents Nos. 1,854,061, 2,936,287—Example 1 and 1,458,542) in order to disperse the very fine metal particles in the coating medium. This causes mechanical working of the magnetic metal which alters the magnetic properties in undesirable manner, particularly the ferro-magnetic metal particles which being relatively soft tend to work harden and lose magnetic permeability. Certain anisotropic iron crystals "domain crystals" are needle shaped brittle and very fragile so that they cannot be coated by ball milling without fracturing. The present method makes the coating very simple to carry out without fear of breaking the needles.

Still other methods of coating with resins of high melting point require heating which also tends to cause loss of magnetism. This disadvantage is avoided by the method of the invention.

Another advantage of the coated metal products of the invention containing less than 6% of resin on a weight basis of resin coated metal lies in the achievement of new metal pigments for use in vehicles which ordinarily liver. To illustrate, finely divided cobalt metal is so reactive with drying and semi-drying oils containing free fatty acid that it reacts to form a precipitate, but when it is protected with the coating of the invention its reacivity is completely eliminated.

In curing or vulcanizing schemes the foregoing type of coating on cobalt is especially suitable for high temperature baking under vehicle formulation conditions as will dissolve the coating in the vehicle to cause curing by the cobalt.

To illustrate this last use, consider the case of adding 1% cobalt as metal to a drying oil varnish containing fatty acid such as commercial tall oil varnish. An example of a vehicle for such tall oil varnish is Acintol D, a product of Arizona Chemical Company, New York City. This varnish livers badly with cobalt drier due to free fatty acid.

By coating cobalt particles with vinyl resin livering is completely stopped after mixing cobalt in at room temperature. Coated aluminum may be added for further pigmentation.

By suitably adjusting the content of strong solvent in the acintol varnish there will be no tendency for the vinyl resin coating to lift from the cobalt particles.

However upon heating the varnish to baking temperature (400°–500° F.) the tall oil vehicle will start to dissolve the vinyl coating and the cobalt will become free of the vinyl casing to act as a catalyst.

In this manner the coated cobalt particles act as a latent catalyst. The thinness of the coating can be controlled very simply by the method of the invention to give further control in the use.

What is pointed out above in respect to the vinyl coating is likewise true for the acrylic coating and the oil modified polyamide system.

The coating effectively insulates the underlying method both physically and electrically in any desired thinness.

The following examples will serve as specific illustrations of the novel electrostatic coating method of the invention which in a preferred embodiment is used in the preparation of coated magnetic particles suitable for preparing magnetic recording tape, molded magnetic cores, magnetic inks and the like.

*Example I*

The following steps were carried out in this example which works on the principle that like charges repel and opposite charges attract.

A coating solution was prepared by dissolving five grams of "Versamid 950" in 100 milliliters of isopropyl alcohol. "Versamid 950" is a product of General Mills, Inc. and may be prepared by reacting dimerized soybean oil fatty acids and ethylene diamine, in suitable proportions, and at a temperature of 130°–200° C. under stirring for a time to reach a final melting point of 105°–115° C., there being present about 300 parts of fatty acid to about 40 parts of ethylene diamine and the reaction being carried to a point where the acid number is less than 20, preferably from 5–15, and the amine number is less than 40.

Generally speaking any polyamide resin of the Versamid type can be used which has a molecular weight between 1,000 and 10,000, a carboxyl number of 1–100, and a melting point above 60° C. If a lower metling Versamid is used, it can be reacted with an epoxy resin and its melting point thereby raised by after-treatment with epoxy resin. Other fatty acids are commonly used in making the polyamide such as the polymerized fatty acids resulting from the polymerization of drying or semi-drying oils, or the free acids or simple aliphatic alcohol esters of the acids of such oils as linseed, tung, perilla, oiticica, cottonseed, corn, tall, sunflower, safflower, dehydrated castor oils. Other polyamines can be used such as diethylene triamine, triethylene tetramine, dimethylamino propylamine, diethylamino propylamine, etc., (see patent to Cowan, U.S. No. 2,450,940).

Water was titrated into the solution until the resin began to precipitate in colloidal form and when a cloudy suspension was evident (about 7.1 milliliters of water to 100 milliliters of isopropyl alcohol).

77.17 grams of iron carbonyl powder (1–3 microns diameter) were mixed into the cloudy solution of Versamid with stirring. Additional water was then added in an amount of approximately twice (14.2 milliliters), the quantity used to precipitate the colloidal form of the resin. The amount of additional water may be from two to three times the amount used to bring initial turbidity. In this manner each particle of iron carbonyl was coated.

The colloidal charge on the resin was determined by electrophoretic deposition and was negative. The negative resin was substantially completely exhausted by attraction to the positively charged iron particles. The product was separated by filtering, air dried, and examined under the microscope. This was found to be uniformly coated.

In the above manner Versamid solutions were used to make iron-resin binder combinations containing 1–6% of resin.

The product obtained was Versamid coated carbonyl iron powder.

*Example II*

The resin solution was prepared in similar manner as in Example I except that instead of using "Versamid 950" a vinyl polymer was employed as the thermoplastic resin, e.g., "Exon 470," a copolymer of vinyl chloride and vinyl acetate of relatively low molecular weight, e.g., about 12,000, containing from 10% to 40% of vinyl acetate and soluble in acetone, methyl-ethyl ketone and mixtures of these with isopropyl alcohol.

Suitable as vinyl polymer are such polymers as VMCH, VYHH, VMCH, VYCC, VYLF, and VAGH which are all low molecular weight vinyl chloride-vinyl acetate polymers of the Vinylite series and described in Schildknecht, "Vinyl and Related Polymers," published by John Wiley and Sons, 1952.

Also there may be used vinyl formal and vinyl butyral resins, these being soluble in ketone solvents.

The selection of the resin determines the hardness and tackiness of the coating, the formal desin being softer and more tacky.

Also there may be used vinylidene chloride-vinyl chloride copolymers which are soluble in acetone.

The charged colloid resin was prepared by adding water, 3.2 parts of water to 50 parts of solution containing 1 gram of "Exon 470" in 50 cc. of acetone. Fifty grams of iron carbonyl powder, 1–3 microns particle diameter, was coated. The solution was found to contain less than .01% resin.

As pointed out in Example I in accordance with the preferred embodiment, additional water is added in an amount of two to three times the amount needed to bring about initial turbidity thereby assuring that the colloidal suspension of resin will be sufficiently negatively charged to produce complete exhaustion of resin from the coating suspension when positively charged solid particles are mixed.

*Example III*

The resin solution was prepared in a manner similar as in Examples I and II, except that "Acryloid B–72" was used instead of either "Versamid 950" or "Exon 470."

"Acryloid B–72" is a polymer of isobutyl methacrylate which was dissolved in acetone.

Two grams of the "Acryloid B–72" resin was dissolved in 50 cc. of acetone to form a clear solution. Thereafter 4.2 cc. of water were added to the first cloudy point and with stirring 50 grams of iron powder of Example I were added. All of the resin was exhausted from the solution and the resin content of the coated particles was 4% by weight, the remainder being iron.

As pointed out in Example I in accordance with the preferred embodiment, additional water is added in an amount of two to three times the amount needed to bring about initial turbidity thereby assuring that the colloidal suspension of resin will be sufficiently negatively charged to produce complete exhaustion of resin from the coating suspension when positively charged solid particles are mixed.

In accordance with the foregoing examples other metals, all less than 10 microns in diameter, were coated as follows to provide resin coating in an amount of 1–6% from volatile organic solvents:

Powdered nickel
Powdered alnico
Powdered aluminum—400 mesh
Powdered copper-nickel-iron alloy—10 microns
Powdered ferrosilicon
Powdered cobalt
Powdered Stellite
Powdered silicon In the foregoing description there have been illustrated certain thermoplastic resins soluble in water miscible organic volatile solvents in an amount of at least 5% by weight in said solvent whereby addition of water to the clear solution in an amount varying from about 2% to about 8% of the solution causes negatively charged colloidal resin particles to be formed whereby coating may be carried out at room temperature to exhaust the resin from the liquid colloid system and the coated metal product can be isolated by the simple steps of filtering and drying at room temperature. This method is not successful with resins other than soluble thermoplastic resins of the vinyl type, acrylic type and the oil modified polyamide type. Resins like melamine-formaldehyde, urea-formaldehyde, phenol-formaldehyde and aryl sulfonamide are not suitable because they do not give the desired negative charge in the volatile alcohol or ketone solvent.

Other thermoplastic resins such as polyethylene, polypropylene, polyisobutylene, polybutadiene and polyacrylonitrile are not suitable since they do not develop the desired charge. In general, the suitable solvents for the resin cannot include aromatic solvents even in small proportions in mixture, because emulsions tend to form and the coating result by electrostatic attraction is not obtained. Amine solvents do not appear to be suitable. The method is also not based upon the use of resins in salt form such as in the case of sodium polyacrylate, polyelectrolyte.

While the invention has been particularly described with reference to prefered embodiments thereof, it will be understood by those skilled in the art that various changes in form and details may be made therein without departing from the spirit and scope of the invention.

What is claimed is:

1. A method of uniformly coating finely divided metal particles at room temperature consisting essentially of dissolving an acetone-soluble thermoplastic resin in an amount of from about 2% to about 8% by weight in a volatile lower aliphatic oxygenated water-miscible organic solvent selected from the group consisting of ethyl alcohol, propanol, acetone, methyl ethyl ketone, and aceto nitrile to form an organic solvent solution therewith, adding water to said organic solvent solution in amount sufficient to cause turbidity whereby said thermoplastic resin is converted from the solution state into a negatively charged colloid suspended in the solvent-water mixture, mixing the suspended colloid with finely divided metal particles under agitation whereby said metal particles being positively charged become uniformly coated by attraction of the negative charges of the colloidal resin, thereafter adding water in an amount at least two times greater than the amount for initial turbidity and separating and isolating the resin coated metal particles each in individually coated condition suitable for drying at low temperature.

2. A method of coating as claimed in claim 1 wherein said metal particles are carbonyl iron of particle size of 1–3 microns and said thermoplastic resin is an acrylic resin.

3. A method of coating as claimed in claim 1 wherein said metal particles are iron alloy particles of size less than 10 microns and said thermoplastic resin is vinyl chloride resin.

4. A method of coating as claimed in claim 1 wherein said metal particles are aluminum of size less than 10 microns and said thermoplastic resin is acrylic resin.

5. A method of coating as claimed in claim 1 wherein said metal particles are magnetic alloy of aluminum, nickel and cobalt and said thermoplastic resin is acrylic resin.

6. A method of coating as claimed in claim 1 wherein said metal particles are cobalt and said thermoplastic resin is vinyl chloride resin.

7. A method of coating as claimed in claim 1 wherein said metal particles are iron and said thermoplastic resin is oil modified polyamide resin.

8. A method of coating as claimed in claim 1 wherein said metal particles are aluminum and said thermoplastic resin is vinyl chloride resin.

9. A method of coating as claimed in claim 1 wherein said metal particles are silicon and said thermoplastic resin is vinyl chloride resin.

References Cited by the Examiner

UNITED STATES PATENTS

| | | | |
|---|---|---|---|
| 2,146,033 | 2/39 | Seavey et al. | 149—6 |
| 2,481,412 | 9/48 | Grindrod | 252—316 |
| 3,042,616 | 7/62 | Brown | 252—62.5 |
| 3,054,751 | 9/62 | Blake et al. | 117—100 |

FOREIGN PATENTS 580,909    8/59    Canada.

WILLIAM D. MARTIN, *Primary Examiner.*

RICHARD D. NEVIUS, *Examiner.*